(12) United States Patent
Akireddy et al.

(10) Patent No.: US 10,778,693 B2
(45) Date of Patent: Sep. 15, 2020

(54) NETWORK-BASED REAL-TIME DISTRIBUTED DATA COMPLIANCE BROKER

(71) Applicant: Cisco Technology, Inc., San Jose, CA (US)

(72) Inventors: Ravi Akireddy, San Jose, CA (US); Robert S. Estes, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 16/117,371

(22) Filed: Aug. 30, 2018

(65) Prior Publication Data

US 2019/0014123 A1  Jan. 10, 2019

Related U.S. Application Data

(63) Continuation of application No. 14/330,816, filed on Jul. 14, 2014, now Pat. No. 10,084,795.

(51) Int. Cl.
| | |
|---|---|
| *H04L 29/06* | (2006.01) |
| *H04L 29/08* | (2006.01) |
| *G06F 9/50* | (2006.01) |

(52) U.S. Cl.
CPC .......... *H04L 63/105* (2013.01); *G06F 9/5055* (2013.01); *H04L 63/20* (2013.01); *H04L 67/10* (2013.01)

(58) Field of Classification Search
None
See application file for complete search history.

(56) References Cited

U.S. PATENT DOCUMENTS

| | | |
|---|---|---|
| 7,774,826 B1 | 8/2010 | Romanek |
| 8,613,070 B1 | 12/2013 | Borzycki |
| 8,849,955 B2 | 9/2014 | Prahlad |
| 9,280,678 B2 | 3/2016 | Redberg |
| 9,621,524 B2 | 4/2017 | Brenner |
| 9,928,379 B1* | 3/2018 | Hoffer ................. G06F 21/6245 |
| 2005/0223412 A1 | 10/2005 | Nadalin et al. |
| 2007/0150947 A1 | 6/2007 | Viayakumar |
| 2007/0156897 A1 | 7/2007 | Lim |
| 2007/0157203 A1 | 7/2007 | Lim |

(Continued)

OTHER PUBLICATIONS

Wrona et al., Controlled Information Sharing in Nato Operations, ACM, dated 2011, 6 pages.

(Continued)

*Primary Examiner* — Brandon S Hoffman
(74) *Attorney, Agent, or Firm* — Lee & Hayes, P.C.

(57) ABSTRACT

In an embodiment, a data processing system comprises: one or more processors; one or more non-transitory computer-readable storage media storing sequences of instructions which, when executed by the one or more processors, cause the processor to perform: in a local data service, receiving a request for processing data; identifying one or more local policies applicable to the request; based, at least in part, on the one or more local policies, determining whether the request may be processed locally; in response to determining that the request may not be processed locally, transmitting the request to one or more remote brokers to cause the one or more remote brokers to determine a remote data service configured to process the request.

20 Claims, 8 Drawing Sheets

(56) References Cited

U.S. PATENT DOCUMENTS

| | | |
|---|---|---|
| 2009/0106557 A1 | 4/2009 | Leonard |
| 2010/0082538 A1 | 4/2010 | Rentsch et al. |
| 2010/0100925 A1 | 4/2010 | Hinton |
| 2010/0146269 A1 | 6/2010 | Baskaran |
| 2010/0228962 A1 | 9/2010 | Simon |
| 2010/0325199 A1 | 12/2010 | Park |
| 2010/0332401 A1* | 12/2010 | Prahlad .............. G06F 3/0649 705/80 |
| 2010/0333116 A1 | 12/2010 | Prahlad |
| 2011/0126261 A1 | 5/2011 | Maes |
| 2013/0110778 A1 | 5/2013 | Taylor |
| 2013/0110967 A1 | 5/2013 | Ueoka |
| 2013/0117240 A1 | 5/2013 | Taylor |
| 2013/0219176 A1 | 8/2013 | Akella |
| 2013/0227099 A1 | 8/2013 | Hinton |
| 2013/0238752 A1 | 9/2013 | Park |
| 2013/0297662 A1 | 11/2013 | Sharma |
| 2014/0007239 A1 | 1/2014 | Sharpe |
| 2014/0081667 A1 | 3/2014 | Joao |
| 2014/0082717 A1 | 3/2014 | Kang |
| 2014/0113593 A1 | 4/2014 | Zhou |
| 2014/0115028 A1 | 4/2014 | Taylor |
| 2014/0122580 A1 | 5/2014 | Nuaimi |
| 2014/0380445 A1 | 12/2014 | Tunnell |
| 2015/0154418 A1 | 6/2015 | Red Berg |
| 2015/0237117 A1 | 8/2015 | Taylor |
| 2015/0281275 A1 | 10/2015 | Martini |
| 2016/0014140 A1 | 1/2016 | Akireddy et al. |

OTHER PUBLICATIONS

Shtern et al., An Architecture for Overlaying Private Clouds on Public Providers, IFIP, dated 2012, 7 pages.

Luo et al., Automaton Segmentation: A New Approach to Preserve Privacy in XML Information Brokering, ACM dated 2007, 11 pages.

Li et al., "Enforcing Secure and Privacy Preserving Information Brokering in Distributed Information Sharing", dated 2013, IEEE, 13 pages.

European Patent Office, "Search Report" in application No. PCT/US2015/039441, dated Oct. 27, 2015, 8 pages.

European Patent Office, "Search Report" in application No. 15 745 619.5-1221, dated Jan. 26, 2018, 4 pages.

European Claims in application No. PCT/US2015/039441, dated Oct. 2015, 5 pages.

European Claims in application No. 15 745 619.5-1221, dated Jan. 2018, 3 pages.

Budgen, et. al., "A Data Integration Broker for Healthcare Systems", Computer, IEEE Computer Society, USA, vol. 40, No. 4, Apr. 2007, pp. 34-41.

Summons to Attend Oral Proceedings from the European Patent Office for Application No. 157456195, dated Nov. 18, 2019, a counterpart foreign application of U.S. Appl. No. 16/117,371, 7 pages.

Zhu, et. al., "Dynamic data integration using web services", IEEE International Conference on Web Services (ICWS' 04), Piscataway, NJ, IEEE Computer Society, Jul. 6, 2004, 8 pages.

\* cited by examiner

NETWORK-BASED REAL-TIME DISTRIBUTED DATA COMPLIANCE BROKER

BENEFIT CLAIM

This application claims the benefit under 35 U.S.C. § 120 as a Continuation of U.S. Pat. No. 10,084,795, filed Jul. 14, 2014, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE DISCLOSURE

The present disclosure generally relates to managing data storage units of a distributed data storage system. The disclosure relates more specifically to techniques for enforcing data compliance policies that relate to when and where data may be stored on the data storage units.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Services specific to information and communication technology (ICT) often include storing data on persistent storage devices. The services may be available to users from almost any location and via a variety of communications networks. The services may include transmitting data across commercial and jurisdictional boundaries; for example, data may be created using computers located in one country and stored in data storage units located in a different country.

However, transmitting data across various boundaries is often regulated by various agreements and protocols. Examples of the agreements may include inter-governmental agreements, national and local laws and regulations, standards, and contracts. They may require persistently storing data that is governed by certain entities only within certain territories or boundaries or only at particular locations. The requirements may apply to a variety of data.

Hence, although providing ICT services inherently involves communication across different countries and commercial boundaries, commercial and international regulations and requirements may restrict how the services can be used. These problems become acute when the computers and data storage units are within geographically distributed data centers or cloud computing environments.

DETAILED DESCRIPTION

Figure 1:
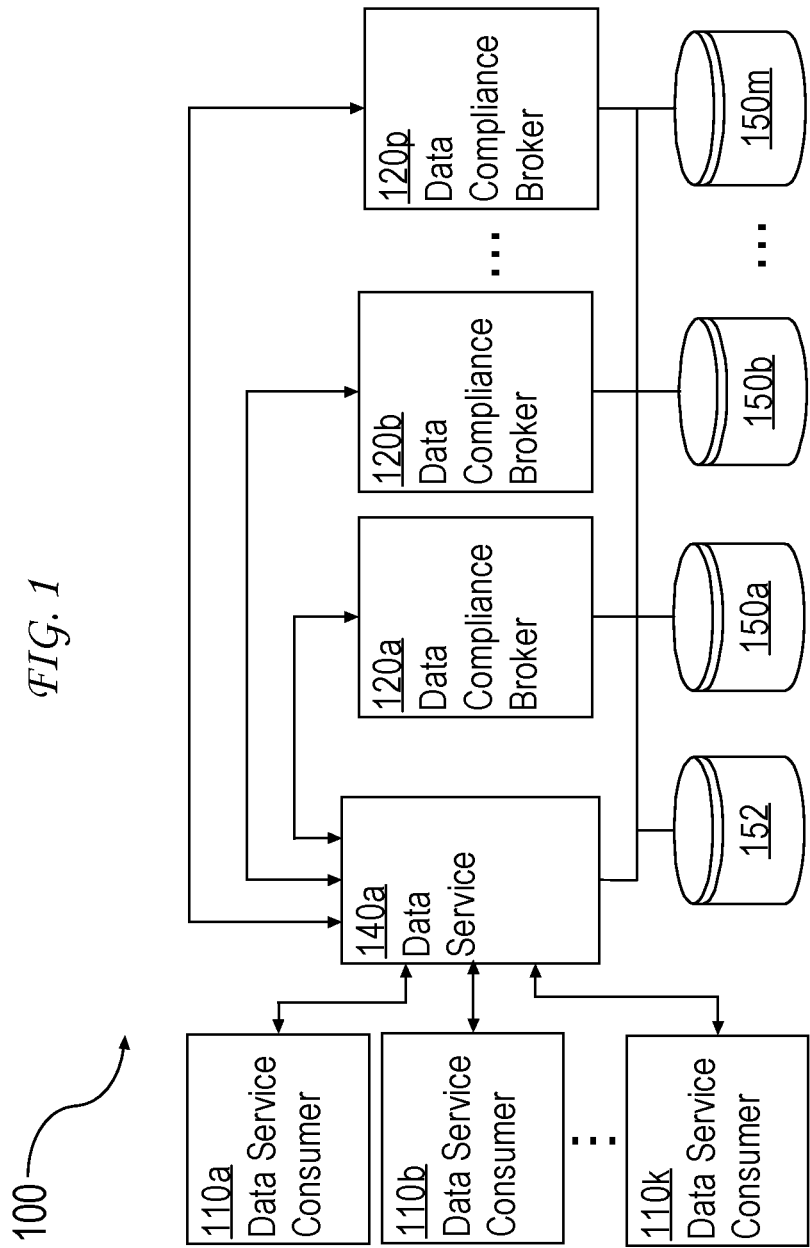
FIG. 1 illustrates an example of a distributed data system for enforcing data compliance policies on data.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

This description follows the following outline:
1. Overview
2. Structural Overview
    2.1. Data Service Consumers
    2.2. Data Services
    2.3. Data Compliance Brokers
    2.4. Proxy Pointer Stores
    2.5. Policy Administration Points (PAP)
3. Federated Brokers
4. Ontologies
5. Mappings
6. Create/Read/Update/Delete (CRUD) Requests
7. Compliance Policies
    7.1. Example of Processing CRUD Requests
    7.2. Compliance-Brokered Read Access Control
    7.3. Compliance-Brokered Write Access Control
8. Implementation Example—Hardware Overview
1. Overview Embodiments provide techniques that relate to brokerage services for managing data in a distributed data system. The techniques include the approaches for enforcing data compliance policies by network-based, real-time distributed data brokers on data of a variety of kinds.

In an embodiment, a local data service receives a request for processing data. The request may be received from a customer that has access to the local data service. For example, the request may be a request to retrieve a particular data record from a particular database maintained by the local data service. In general the request may be to create, read, update or delete data.

The local data service may be any entity configured to manage and communicate electronic data between customers and storage devices. For example, the local data service may be a website maintained by a healthcare service provider company that provides services to healthcare providers and patients. The local data service may receive request for creating, reading, updating or deleting data records maintained by the healthcare service provider for the patients.

Upon receiving a request, the local data service may determine whether the request may be processed locally. For example, if the request is for providing a data record of a particular patient, then the local data service may determine whether the requested record is stored locally. Furthermore, the local data service may determine whether a requester who requested the data record is authorized to make such a request. Moreover, the local data service may determine whether the requested data record may be provided in clear, or the requested data record is to be encrypted. For example, the local data service may determine an encryption scheme to be applied to the requested data record. These and similar determination may be made based on one or more data access policies.

To determine whether a request may be processed locally, a local data service may use a policy access point. A policy access point may identify one or more local policies that are to be applied to the request. The policies may be retrieved and provided to the policy access point by a policy administration point.

In an embodiment, the local data service sends a local policy request to a local policy access point to provide one or more local policies that are to be applied to the request.

Upon receiving one or more local policies, the local data service may invoke a local policy execution point to cause the local policy execution point to apply the one or more local policies to the request to determine whether a received request may be processed locally.

Based, at least in part, on one or more local policies, the local policy execution point determines whether a received request may be processed locally. For example, the local policy execution point may determine whether the requested data record for a particular patient is stored locally, and whether the requester is authorized to request such a record.

In response to determining that a request may be processed locally, a local data service may invoke one or more local brokers to initiate the processing of the request. For example, the local data service may invoke a particular local broker to retrieve and provide a data record requested by the request.

2. Structural Overview

In an embodiment, a distributed data system is managed by brokers configured to enforce data compliance policies on data at rest, data in motion and data in action. A distributed data system may provide services to a plurality of data service consumers, and may manage access to data stored in persistent storage devices of the distributed system.

FIG. 1 illustrates an example of a distributed data system 100 for enforcing data compliance policies on data. In an embodiment, distributed data system 100 comprises one or more data service consumers 110a, 110b, 110k, at least one data service 140a, one or more data compliance brokers 120a, 120b, 120p, and one or more storage devices, including proxy pointer stores 150a, 150b, 150m, and registries 152. For purposes of illustrating a clear example, FIG. 1 shows a limited number of the data service consumers, data compliance brokers, and storage devices, but in other embodiments there may be any number of such elements, as indicated by the ellipses in FIG. 1.

In the example depicted in FIG. 1, data service consumers 110a, 110b, 110k comprise computers that are configured to communicate with a data service 140a. For example, data service consumers 110a, 110b, 110k may be included in the same local area network, and each of data service consumers 110a, 110b, 110k may communicate with data service 140a implemented in the local area network. Typically there is one data service 140a per LAN. Data service 140a comprises a computer that is configured to perform the data service operations that are described further herein.

Figure 2:
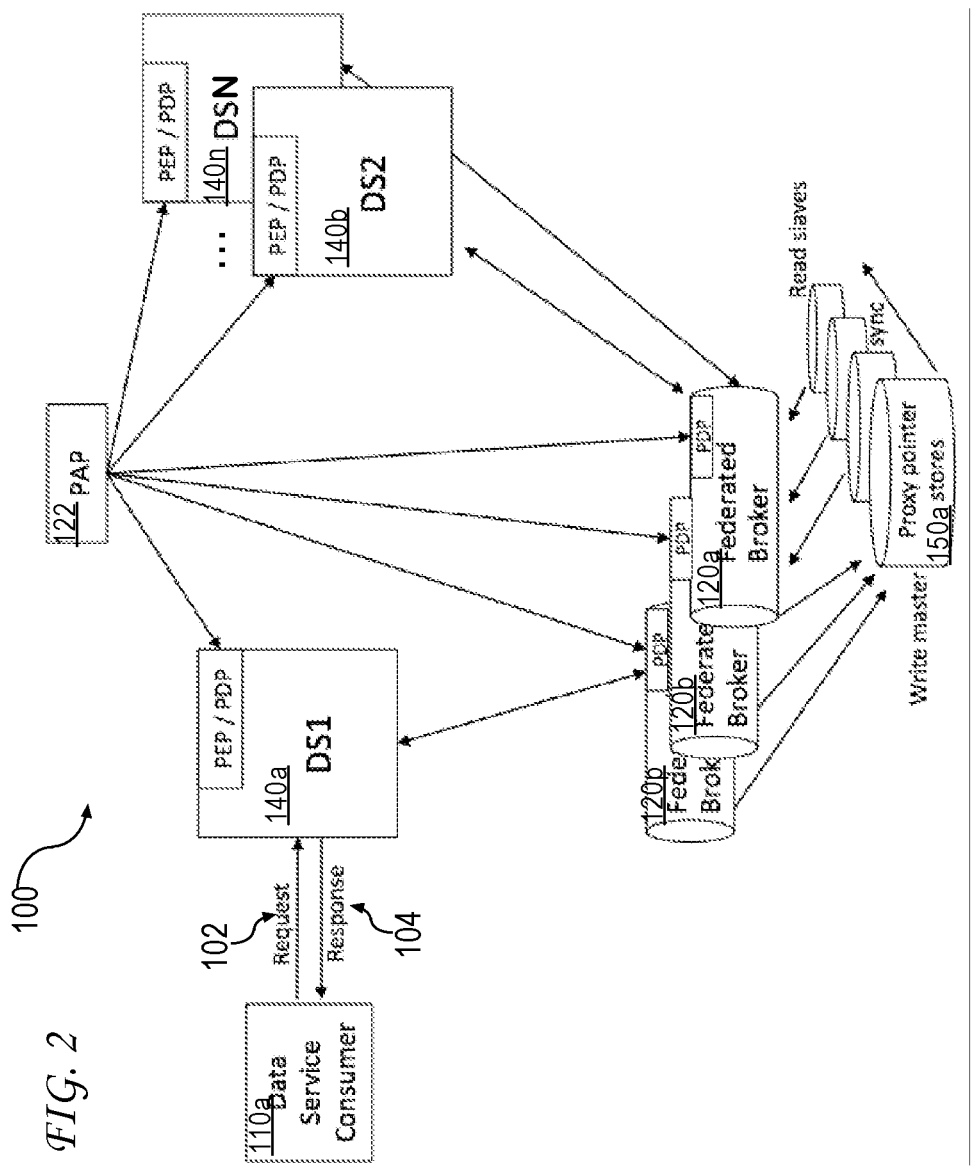
FIG. 2 illustrates an example of a distributed data system for enforcing data compliance policies on data.

Other embodiments may include a plurality of data services 140a, 140b, 140n as depicted in FIG. 2, which is further described below.

2.1. Data Service Consumers

Data service consumers 110a, 110b, 110k may be configured to issue requests to create, read, update, delete, or otherwise process data. In an embodiment, data service consumers 110a, 110b, 110k may correspond to (or represent) users of distributed data service 100. For example, data service consumer 110a may generate and issue a request to create and store a particular data record in a database dedicated to storing medical records of patients of a particular healthcare service provider. The request may be directed to data service 140a, which could be configured locally with respect to data service consumer 110a.

Upon receiving a request, data service 140a may direct the request to one or more data compliance brokers 120a, 120b, 120p, which may retrieve a data compliance policy, and use the policy to determine whether, or to which proxy pointer stores 150a, 150b, 150m, the request should be sent. Each of the data compliance brokers 120a, 120b, 120p may comprise a computer or may be implemented as one or more computer programs, other software elements, processes or threads on another computer that implements the data service 140a. Further, in some embodiments the data service 140a, data compliance brokers 120a, 120b, 120p and storage units 150a, 150b, 150m may be integrated; for example a data service 140a and broker 120a could be implemented in a storage controller that is associated with storage unit 150a.

A request to access the data may be rejected by a data compliance broker for a variety of reasons. For example, the request may identify data that is in a data storage device that is in a geographical location that the requester is not permitted to access; the request may identify data for which the requester does not have access rights or permissions; the request may ask for data that is inaccessible to a requester; the request may refer to data that does not exist; the request may specify a requester that is not authorized to request the data from distributed data system 100; the request may contain incomplete or incoherent parameters; and the like. These and similar reasons for rejecting the request may be specified in data access policies. The policies may be applied to the request to determine whether to grant or deny access to the requested data.

2.2. Data Services

Data service 140a may be configured to receive requests for creating, reading, updating, deleting, or otherwise processing data records maintained by distributed data system 100. Data service 140a may receive a request from any of data service consumers 110a, 110b, 110k. For example, data service 140a may receive a request from a data service consumer 110a to update a particular data record in a persistent storage device.

Upon receiving a request, data service 140a may invoke one or more data compliance brokers 120a, 120b, 120p. The brokers may request and receive data access policies that are to be applied to the request. The brokers may apply the policies to the request to perform, for example, data integrity checks on the request data, an authentication of the requester who issued the request, determine whether the request may be processed, and if so, determine a proxy data store, from data proxy data stores 150a, 150b, 150m, that is configured to process the request.

Data service 140a may be implemented in any type of computer that is configured to manage data or as part of a storage device. For example, data service 140a may be implemented in a server computer configured to manage data utilized by a particular healthcare service provider.

Data service 140a may be implemented as a server computer that is situated locally with respect to data service consumers 110a, 110b, 110k. For example, data service 140a may be implemented in a local area network that also includes data service consumers 110a, 110b, 110k. For example, data service 140a may have a dedicated, usually secure, connection with a local area network that also includes data service consumers 110*a*, 110*b*, 110*k*.

2.3. Data Compliance Brokers

FIG. 2 illustrates an example of a distributed data system 100 for enforcing data compliance policies on data. In an embodiment, distributed data system 100 comprises a data service consumer 110*a*, a plurality of federated data compliance brokers 120*a*, 120*b*, 120*p*, a plurality of data services 140*a*, 140*b*, 140*n*, one or more policy administration points (PAP) 122, and a plurality of proxy pointer stores 150*a*, 150*b*, 150*m*. In the depicted example, distributed data system 100 includes one data service consumer 110*a*; however, other embodiments may include a plurality of data service consumers 110*a*, 110*b*, 110*k*.

Data compliance brokers 120*a*, 120*b*, 120*p* may be configured to monitor data flow in distributed data system 100, receive requests from one or more data services 140*a*, 140*b*, 140*n*, determine compliance policies for the data flow, determine compliance policies for the received data request, and process the received data request according to the compliance policies. For example, data compliance broker 120*a* may receive, from a data service 140*a*, a request to store a particular data record in a database dedicated to storing medical records maintained by a particular healthcare service provider. Upon receiving such a request, data compliance broker 120*a* may determine one or more compliance policies that govern data maintained by the particular healthcare service provider, and use the compliance policies to identify a proxy pointer store, from a plurality of proxy pointer stores 150*a*, 150*b*, 150*m*, that may be configured to further process the request.

2.4. Proxy Pointer Stores

Proxy pointer stores 150*a*, 150*b*, 150*m* may be configured to facilitate storing data in persistent storage devices and retrieving data from the devices. To facilitate these tasks, proxy pointer stores 150*a*, 150*b*, 150*m* may maintain mappings between data proxy pointers and physical addresses of databases configured as persistent storages.

Each mapping may associate proxy pointers, pointing to persistent storages, and physical addresses of the persistent storages. A mapping may be queried using a proxy pointer to provide a physical address of the persistent storage associated with the proxy pointer. For example, a mapping may be searched using a proxy pointer, and, in response to the search, the storage's physical address associated with the proxy pointer may be found using the mapping. A proxy pointer, in this context, is a pointer to a proxy server which acts as an intermediary for requests from data services. A pointer to a proxy server may be a Uniform Resource Locator (URL) address to a proxy server that, as an intermediary for requests from data service, may facilitate access to the data requested by the data services. For example, upon receiving, from a data service, a proxy pointer at a proxy pointer store, the proxy pointer store may use the received proxy pointer and the mappings to identify a physical address of the data requested by the data service.

A mapping may be updated each time any association between proxy pointers and physical addresses of databases changes. The association may change if either proxy pointers or physical addresses change. For example, since databases are often implemented in redundant configurations, a correspondence between a proxy pointer and a physical address of the actual database may change depending on whether an active database or a redundant database is used. If the active database fails, then the redundant database becomes active and is used as a replacement for the failed database. Switching between the active and redundant databases may be reflected in the mapping.

Using the mappings maintained by proxy pointer stores 150*a*, 150*b*, 150*m* may be illustrated using the following example: upon receiving a particular request, and determining that the request pertains to storing a data record of a patient who received services by a particular healthcare service provider, a federated broker, from one or more federated brokers 120*a*, 120*b*, 120*p*, may determine a logical name of the database that is configured to store data records of patients of the particular healthcare service provider. The database may be determined by applying data access policies to the request. For example, by applying the data access policies to the request, a federated broker may determine that a database "A" is configured to store patient records of the patients who receive services from the particular healthcare service provider.

Once a federated broker determines that a database 'A" is configured to store a data record specified in the request, the federated broker may identify a proxy pointer that points to the database "A." For example, the federated broker may determine a proxy pointer for the logical name "A" of the database "A." The proxy pointer may be a URL address of a server on which the database "A" is implemented. Once the proxy pointer is determined, the federated broker may transmit the request and the proxy pointer to one or more proxy pointer stores 150*a*, 150*b*, 150*m*.

Upon receiving a request and a proxy pointer, a proxy pointer store, from one or more proxy pointer stores 150*a*, 150*b*, 150*m*, may try to determine a physical address of a database that is configured to store the data record specified in the request. To determine the physical address, a proxy pointer store may use a mapping between proxy pointers and physical addresses of databases maintained in data system 100.

A mapping may be implemented using various data structures, including data tables, data arrays, and the like. For example, a mapping may be implemented to identify a database physical address that is associated with a proxy pointer. Upon receiving a search query with the proxy pointer, a proxy pointer store may search the mapping, and determine the database physical address associated with the proxy pointer.

Databases configured to persistently store data, proxy pointers and physical addresses may be organized as hierarchical databases, relational databases or any other types of databases known in the art.

2.5. Policy Administration Points (PAP)

In an embodiment, data services 140*a*, 140*b*, 140*n* manage sensitive, confidential, or otherwise limited-access data. The data may be managed according to data access and compliance policies. For example, data services 140*a*, 140*b*, 140*n* may use one or more compliance policies to determine whether requests for certain data may be processed, and if so, how the requests are to be processed.

In an embodiment, data access and compliance policies are managed and stored by policy administration points (PAP) 122. In one embodiment, PAP 122 comprises a computer that is independent of the other elements of FIG. 2; in another embodiment, PAP 122 comprises one or more computer programs, other software elements, processes or threads that are hosted on or integrated with one of the data services 140*a*, 140*b*, 140*n* or the federated brokers 120*a*, 120*b*, 120*p*. An example of PAP 122 is depicted in FIG. 2.

PAP 122 may receive requests for providing, storing and updating data access and compliance policies for data system 100. The requests may be directed to PAP 122 from data services 140a, 140b, 140n, and/or federated brokers 120a, 120b, 120p. For example, if data service 140a received a request 102 to write a patient record to a database managed by a particular healthcare service provider, then data service 140a may request from PAP 122 one or more compliance policies that govern storing data managed by the particular healthcare service provider. In response, PAP 122 may send the requested compliance policies to data service 140a and upon receiving the policies the data service may determine the database configured to store the patient record.

Request 102 may include identification data of data service 140a, and identification information that PAP 122 may use to identify and retrieve the requested compliance policies. For example, request 102 may include an Internet Protocol (IP) address of data service 140a, an identifier of data service consumer 140a who sent request 102 to data service 140a, information indicating the nature of request 102, and any additional information that PAP 122 may use to identify and retrieve compliance policies for handling request 102.

Upon receiving a compliance policy that governs request 102, data service 140a may apply the policy to request 102 and determine the manner for handling request 102. For example, if request 102 pertains to storing payment information from a patient who submitted a payment for services rendered by a particular healthcare service provider, then the compliance policy may provide information pertaining to encryption scheme to be applied to the payment transaction. In particular, the compliance policy may specify the type of encryption that is to be applied to the payment transaction, the identification of the service that handles the payment transactions for the particular healthcare service provider, a logical name of the server that is dedicated to store payment transactions for the particular healthcare service provider, and other request-specific data. Moreover, the compliance policy may specify that request 102 is to be transmitted over a secure connection to a federated broker 120a configured to handle such transactions.

3. Federated Brokers

Each data compliance broker ("broker") 120a, 120b, 120p may comprise a networked computer or service that is configured to monitor data-related requests based on data access and compliance policies.

Brokers are configured to request and receive compliance policies for managing requests received from data service consumers and data services. Brokers may also be configured to apply compliance policies to the received requests. Upon applying the compliance policies to the requests, brokers may determine the manner in which the requests are to be handled.

For example, brokers may be configured to intercept data traffic in distributed data system 100. Furthermore, brokers may be configured to determine one or more policies for managing the data traffic, apply the policy to the intercepted traffic, and direct the intercepted data traffic according to the policy. Moreover, brokers may be configured to manage data traffic specific to particular entity, location or purpose. Brokers may also be configured to receive from PAP 122 one or more compliance policies for managing such a data traffic, and apply the compliance policies to requests, such as request 102. The brokers may be configured to apply the compliance policy to requests, and determine a location of data requested in the requests.

Federated brokers may cooperate with each other, communicate data and requests among each other, and collaboratively manage data transmitted and stored in distributed data system 100. Federated brokers may be federated at different levels, and the levels may be identified based on the types of tasks, types of requests, types of communications networks, and the like.

Brokers that do not collaborate with other brokers are termed non-federated, or individual, brokers. Such brokers usually process the received requests by themselves. Non-federated brokers usually do not communicate with other brokers, and do not rely on other brokers in processing the received requests. For example, such brokers may be configured to centrally manage data transmitted and stored in distributed data system 100.

In an embodiment, federated brokers may facilitate expanding the brokerage services within a distributed data system as new data services are added to the distributed system. For example, other federated brokers may be added to the system of FIG. 2 and placed in network communication with the existing federated brokers 120a, 120b, 120p. Furthermore, the federated brokers may perform data access control at different levels and with respect to data stored in different persistent storage devices. Moreover, the federated brokers may audit data access decisions derived by other brokers and audit each other. This functionality may become especially useful as the distribute data system grows and expands to include heterogenic data services and brokers.

4. Ontologies

In an embodiment, distributed data system 100 compliance policies used to govern data transmitted and stored in distributed data system 100 are organized according to one or more ontologies. The ontologies may provide a structural framework for organizing information utilized by distributed data system 100. For example, the ontologies may be used for organizing rules and procedures used by federated brokers 120a, 120b, 120p, and for managing proxy pointer stores 150a, 150b, 150m. The ontologies may be implemented in various databases, registries, proxies, and the like.

5. Mappings

Data system 100 may be configured to maintain one or more registries 152 containing information about data services 140a, 140b, 140n, federated brokers 120a, 120b, 120p, compliance policies, PAP 122, and the like.

Registries 152 may be implemented using various data organization schemes, and may be configured to store various types of information. For example, a registry may include information about a hierarchical organization of the ontology implemented in distributed data system 100. A registry may also include information about the organization of the data services 140a, 140b, 140n, federated brokers 120a, 120b, 120p, proxy pointer stores 150a, 150b, 150m, and the like.

In an embodiment, a registry is configured to store identifiers of data services 140a, 140b, 140n, location information for each of data services 140a, 140b, 140n, identifiers of federated brokers 120a, 120b, 120p, location information for each of federated brokers 120a, 120b, 120p, and rules for communications between the data services, federated brokers and data stores. For example, a registry may maintain various mappings, including a mapping between identifiers of the data services, identifiers of the federated brokers, and identifiers of proxy pointer stores.

In an embodiment, one or more mappings are used to determine whether a received request may be processed locally or remotely. For example, data system 100 may maintain mappings between types of the requests and identifiers of data services or data stores configured to process the request. The mappings may be represented using data tables, data arrays or other data structures.

An element of a mapping data structure may represent an association between a type of the request and an identifier of the data service or data store configured to process the request. For example, if the type of the request is "write data to database A," and the mapping data structure contains an association between that type and a particular identifier of a remote data store, then the particular identifier of the remote data store may be retrieved from the mapping data structure, and used to process the data writing. The particular identifier may be represented using a proxy reference element, such as a proxy pointer, and the proxy pointer may be used to direct the request to a server that is configured to "write data to database A."

This may be illustrated using the following example: suppose request 102 pertains to storing results of medical tests performed by a particular healthcare service provider for a particular patient. Suppose that request 102 was sent by data service consumer 110a to data service 140a. Upon receiving request 102, data service 140a attempts to determine how to handle the received request, and thus requests, from PAP 122, one or more compliance policies for handling requests related to storing medical test results for the particular healthcare service provider.

Upon receiving compliance policies from PAP 122, data service 140a may apply the compliance policies to request 102 to determine that federated broker 120b, from a plurality of federated brokers 120a, 120b, 120p, is configured to handle request 102. Then, data service 140a may transmit request 102 to federated broker 120b.

Federated broker 120b may request, from PAP 122, additional instructions for handling request 102. The instructions may include a proxy reference (proxy pointer) to a server that is configured to store medical test results for a particular healthcare service provider.

Upon receiving the instructions, federated broker 120n may use the proxy reference (proxy pointer) and another mapping to determine a physical address of one or more proxy pointer stores 150a, 150b, 150m, that corresponds to the proxy pointer, and use the physical address to transmit request 102 to for example, proxy pointer store 150b, from proxy pointer stores 150a, 150b, 150m.

Upon receiving request 102, proxy pointer store 150b stores the medical test results included in request 102. Upon a successful storing of the medical test results, broker 120b may generate and transmit a message indicating the successful writing of the medical test results. If the storing was unsuccessful, then broker 120b may repeat the storing request, or generate a failure message.

Alternatively, federated broker 120b may receive additional instructions indicating that request 102 is to be processed by data service 140b. Upon receiving such instructions, federated broker 120b may transmit request 102 to data service 140b. Then, data service 140b may request from PAP 122 one or more compliance policies for handling request 102, forward request 102 to another broker (for example, federated broker 120c), and let federated broker 120c handle request 102. If the particular medical test results are successfully stored, then federated broker 120c may generate a confirmation message indicating that the results were successfully stored. However, if the particular medical test results were not stored successfully, then federated broker 120c may request retransmission of request 102, or generate an error message indicating difficulties in storing the test results.

Messages generated by federated brokers may be transmitted to other brokers and then from the federated brokers to data services, or directly to data services. Data services 140a, 140b, 140n may transmit the messages as responses 104 to data service consumer 110a.

The above described example illustrates merely one of many scenarios for managing data in distributed data system 100. In other scenarios, request 102 may be transmitted to and/or processed by several data services and/or several federated brokers. Furthermore, some requests 102 may be parsed into components and the components may be transmitted to different data services and/or different federated brokers.

6. Create/Read/Update/Delete (CRUD) Requests

Distributed data system 100 manages CRUD requests for creating, reading, updating deleting, or otherwise processing data maintained by data system 100. A CRUD request may be a data access transaction pertaining to creating data records, reading data records, updating data records, or deleting data records. Other types of transactions may also be applicable to the presented approach.

7. Compliance Policies

In an embodiment, brokerage services of a distributed data system utilize data access and compliance policies for managing data in the system. The policies may be stored in registries 152 depicted in FIG. 1. The data access and compliance policies may be enforced by distributed data brokers implemented in the system. The policies may be used to determine whether CRUD requests may be processed, and if so, the manner in which the CRUD requests are to be processed.

7.1. Example of Processing CRUD Requests

Figure 3:
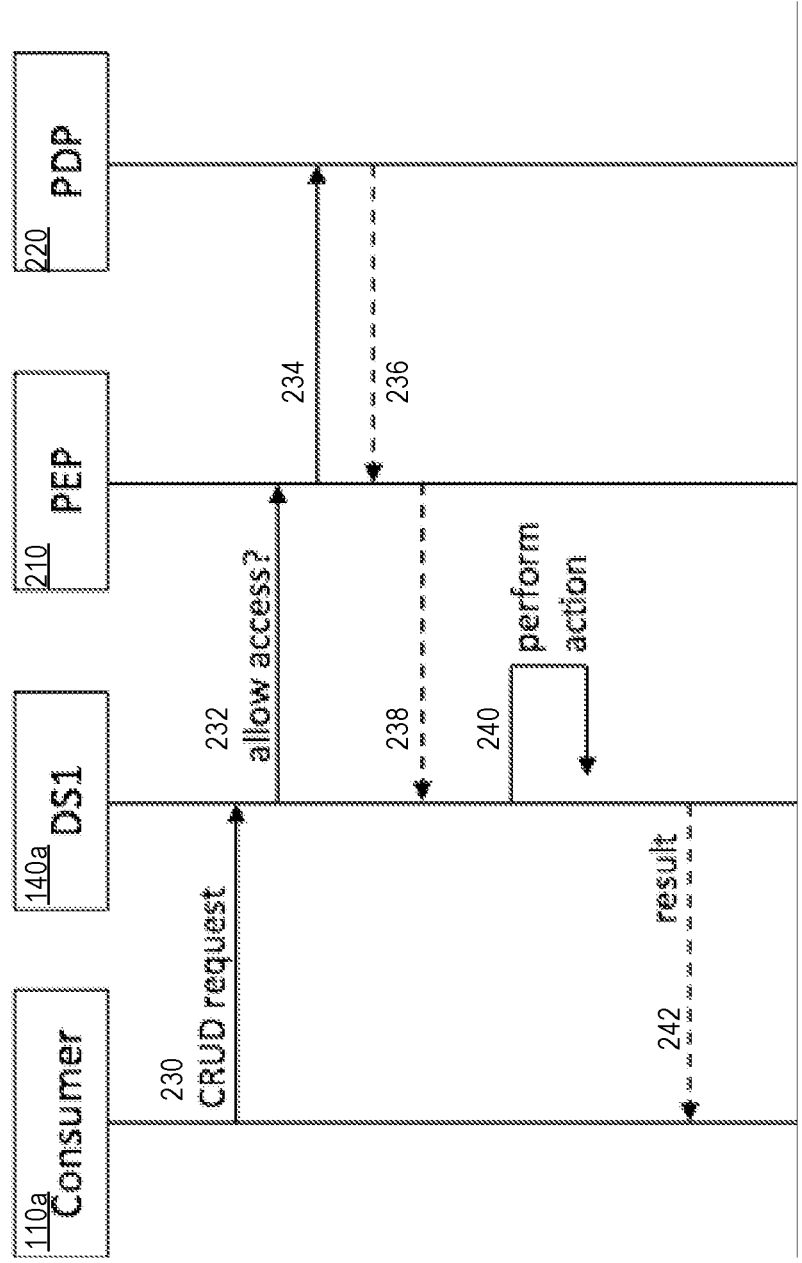
FIG. 3 illustrates an example of processing CRUD requests.

FIG. 3 illustrates an example of processing CRUD requests. CRUD requests may be generated and issued by any of data service consumers 110a . . . 110n. In the depicted example, CRUD request 230 is issued by consumer 110a.

Data service consumer 110a may be configured to issue requests to read, write, delete, or otherwise access or process data. Data service consumer 110a was described in previous sections.

Typically, data service consumer (consumer) 110a transmits CRUD request 230 to a local data service. In the depicted example, consumer 110a transmits CRUD request 230 to data service 140a, which happened to be located near consumer 110a. Data service 140a was described in previous sections.

Upon receiving CRUD request 230, data service 140a may determine the type of access requested in CRUD request 230, and whether the request to access data is to be allowed. Depending on the implementation, data service 140a may attempt to make such determinations by itself, or may contact a policy engine executed on another device. The example of FIG. 3 depicts an embodiment in which data service 140a invokes a broker executed on data service 140a, and use the broker to retrieve one or more polices that are to be applied to CRUD request 230. In other embodiments, not depicted in FIG. 3, data service 140a may contact PAP 122 (not depicted in FIG. 3) executed on another device, obtain instructions from PAP 122 for forwarding CRUD request 230 to a federated broker, and cause the federated broker to process CRUD request 230.

Referring again to FIG. 3, upon receiving CRUD request 230, data service 140a transmits a message 232 to a Policy Enforcement Point (PEP) 210, which may be implemented as a brokerage service of data service 140a. Message 232 may include a request to provide a decision whether access to data specified in CRUD request 230 may be allowed.

Upon receiving message 232, PEP 210 may parse the received message 232, and use the parsed information to retrieve one or more policies that govern CRUD request 230.

PEP 210 may either apply the policies to CRUD request 230 on its own, or generate a message 234, containing CRUD request 230 and optionally the policies, to a Policy Decision Point (PDP) 220.

PDP 220 is a network service configured to analyze requests, such as CRUD request 230, and make a policy-based decision with respect to the request. A PDP 220 may be implemented as a part of a data service, or may be implemented separately from data services.

PDP 220 may parse the received message 234, and use the parsed information to determine whether access to data specified in CRUD request 230 may be allowed. The decision, indicating that the access is to be either allowed or not, is communicated to PEP 210 in a message 236.

Upon receiving message 236, PEP 210 forwards the content of message 236 in a message 238 to data service 140*a*. The message 238 may indicate to data service 140*a* that the access to data specified in CRUD request 230 is to be either allowed or denied.

Upon receiving message 238, data service 140*a* parses message 238 and extracts, from the parsed message 238, a decision regarding allowing or denying consumer 110*a* access to the data specified in CRUD request 230.

In the example depicted in FIG. 3, message 238 indicated that access to data specified in CRUD request 230 is to be allowed. Hence, in step 240, data service 140*a* allows access to the data, and performs the action specified in CRUD request 230 on the accessed data. For example, if CRUD request 230 specified a "read" request to be performed on a particular data record, then data service 140*a* may identify a particular database that stores the particular data record, access the particular data record in the particular database, and read contents of the particular data record. Upon a successful completion of the "read" request, data service 140*a* generates a message 242, includes the contents of the particular data record, and transmits message 242 to consumer 110*a*.

As an example, assume that consumer 110*a* is a medical receptionist who works in a medical clinic and who tries to schedule a doctor's appointment for a patient. The receptionist enters the patient identification information to the system and issues a request to access a medical record associated with the patient. The request may be interpreted as CRUD request 230 depicted in FIG. 3. CRUD request 230 may be communicated to a healthcare service provider computer system, which may be interpreted as data service 140*a*.

In this example, CRUD request 230 may include a patient identification data. However, it may happen that the included patient identification data does not correspond to identification data of any patients who actually subscribed to the services provided by the healthcare service provider. That may happen if the receptionist mistyped the patient identification data, or the patient's subscription expired, or the patient failed to pay the subscription premium, or for any other reason. Validity of CRUD request 230 may be determined by invoking PEP 210 and PDP 220, which are configured to apply data compliance policies to CRUD request 230 and determine whether the request is to be processed.

Once data service 140*a* of a healthcare service provider receives CRUD request 230, data service 140*a* may determine whether the request to access a medical record of the patient is to be allowed. Determining whether the access to the patient medical record is to be allowed may involve determining whether the patient identification information corresponds to the patient identification data maintained by the healthcare service provider, and if so, determining the persistent storage device on which the medical records of the patients serviced by the healthcare service provider are stored. Data service 140*a* may generate and transmit message 232 to PEP 210, and request that PEP 210 provide the answers.

In response to PEP 210 receiving message 232, PEP 210 may parse the received message 232 and use the content of the parsed message to generate and send a message 234 to PDP 220 requesting that PDP 220 provides the answers.

PDP 220 may parse the received message 234, retrieve access and control policies applicable to CRUD request 230, apply the retrieved policies to CRUD request 230, and determine whether access to a medical record, requested in CRUD request 230, is to be allowed or denied. The decision may be conveyed to PEP 210 in message 236, and then to data service 140*a* in message 238. The decision may also indicate a particular database, from which the requested data is to be retrieved.

Assuming that the request to access a medical record, specified in CRUD request 230, is to be granted, data service 140*a* may, on step 240, access the specified medical record stored in the particular database, retrieve the medical record information from the database. Data service 140*a* may also transmit, in message 242, the retrieved medical record information to a web browser executed on a computer used by the receptionist (consumer 110*a*) and cause the web browser to display the medical record information on a screen of the receptionist' computer.

However, if the request to access a medical record of the patient has been denied, data service 140*a* may generate an error notification, transmit the error notification to a computer used by the consumer 110*a* associated with the receptionist, and cause the web browser executed on the computer to display the error message for the receptionist.

7.2. Compliance-Brokered Read Access Control

Data to which access is requested in a CRUD request may be persistently stored either locally or remotely. In either case, the data may be identified using pointer references, which may include pointers to local storage devices and proxy pointers to remote storage devices. For example, the data may be identified using a pointer to a local storage space, or a proxy pointer to a proxy server that maintains the requested data. A proxy pointer may correspond to a URL address and may be used to identify a physical address to a storage space.

In an embodiment, storage devices that are remote to data service 140*a* may be referred to as remote storage devices and may be managed by remote data services, such as data services 140*b*, 140*n*, depicted in FIG. 1, FIG. 2. Storage devices that are local with respect to data service 140*a* are referred to as local storage devices.

Figure 4:
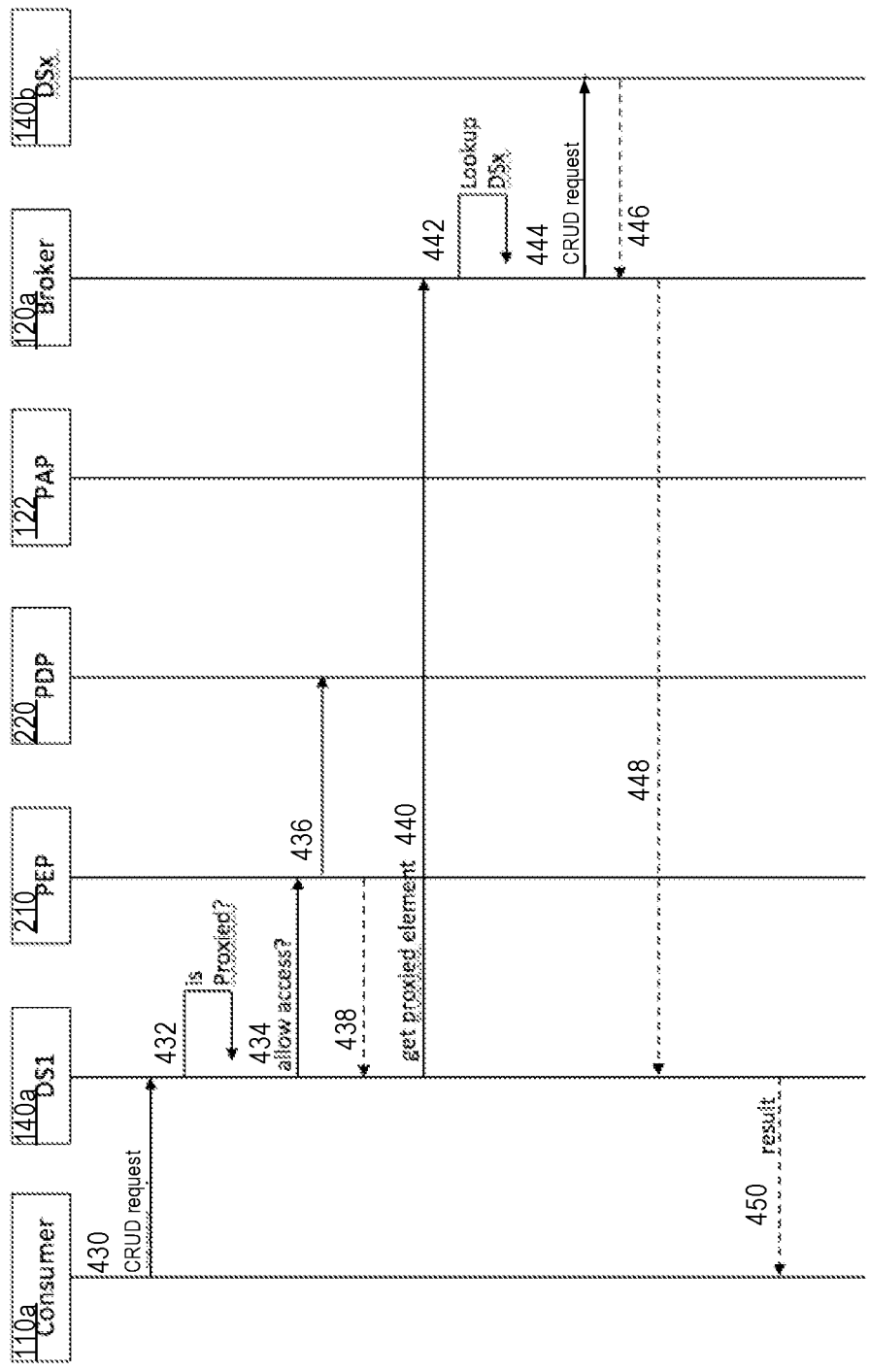
FIG. 4 illustrates an example of a compliance-brokered read access control.

FIG. 4 illustrates an example of a compliance-brokered read access control. The example depicted in FIG. 4 may be relevant to a variety of applications. For example, the example may be applicable to situations when a read-type CRUD request was issued by a patient who queried a healthcare service provider data system to retrieve the results of medical tests performed for the patient. Another application of the example of FIG. 4 may include situations when a read-type CRUD request was issued by an individual who, while traveling abroad, is experiencing some medical emergency, and tries to determine a healthcare service provider facility at which he may receive medical attention. Other application may include situations when a read-type CRUD request was issued by an individual who, while traveling abroad, is experiencing some medical emergency, and for whom medical records are requested by a foreign medical facility. In the above mentioned situations, before the requested data records are provided to the requester, one or more data access policies are to be retrieved and used to determine whether the requested medical records may be indeed provided.

In FIG. 4, CRUD request 430 is generated and issued by data service consumer 110a. For example, CRUD request 430 may be a request generated by a web browser that consumer 110a launched on his computer workstation. Consumer 110a may represent an individual, a customer, a patient, a shopper, and the like. CRUD request 340 may be transmitted to data service 140a, which may correspond to a data service configured to manage data in a distributed data system.

Upon receiving CRUD request 430, data service 140a may determine the type of access requested in CRUD request 430, and whether the request to access data is to be allowed. Depending on the implementation, data service 140a may attempt to make such determinations locally, or may contact federated brokers executed remotely.

In step 432, data service 140a determines whether CRUD request 430 specifies a requested dataset using pointers to local persistent storage devices, or using proxy pointers to remote persistent storage devices. If using the latter, then the requested dataset is unlikely stored locally at data service 140a. Therefore, the requested dataset is to be retrieved from a remote persistent data storage unit.

If the requested dataset is stored persistently locally, then data service 140a transmits a message 434 to a PEP 210, and PEP 210 transmits the contents of message 434 to PDP 220 in a message 436. PEP 210 and PDP 220 may be implemented locally with respect to data service 140a, or in a remote policy engine implemented in remote brokers.

Message 434 may include a request to provide a decision whether access to the dataset specified in CRUD request 430 may be allowed Upon receiving message 434, PEP 210 may parse the received message 434, include the parsed information in a message 436, including a request to provide the decision, and forward message 436 to a PDP 220.

PDP 220 may parse the received message 436, and use the parsed information to determine data access policies for CRUD request 230. PDP 220 may retrieve access control and data compliance policies applicable to CRUD request 430, and use the retrieved policies to determine whether access to the dataset specified in CRUD request 430 may be allowed.

Upon retrieving access control and data compliance policies and applying them to CRUD request 430, PDP 220 may determine whether access to the requested dataset is to be allowed. The decision, indicating that the access is to be either allowed or not, is communicated to PEP 210.

Upon receiving the decision from PDP 220, PEP 210 may enforce the decision, and communicate the decision to data service 140a in a message 438. If the decision indicates that access to the requested dataset is to be allowed, then data service 140a retrieves the requested dataset, and transmits the requested dataset in a message 450 to consumer 110. The contents of message 450 provide results requested by consumer 110a. Upon providing the results to consumer 110a, the process of processing CRUD request 430 is completed.

However, some CRUD requests 430 may indicate that a requested dataset is proxied. For example, the requested dataset may be specified using proxy pointers, not names or addresses that may be resolved locally. In some other situations, the requested dataset may be specified using local addresses; however, those addresses may be unreachable from a data service 140a, and thus need to be resolved by brokers to determine proxy servers that are configured to store the requested dataset.

In an embodiment, data service 140a uses brokers to determine whether a requested dataset may be accessed. To accomplish that, data service 140a generates a message 440, and transmits it to broker 120a. Message 440 may include one or more proxy pointers that point to (identify) a location of the dataset requested in CRUD request 430.

Upon receiving message 440, broker 120a may parse message 440 to determine one or more proxy pointers for a data service that is configured to process requests such as CRUD request 430.

In step 442, broker 120a performs a data service lookup to identify a particular data service that is configured to process CRUD request 430, and in particular, to facilitate access to the dataset requested in CRUD request 430. For example, broker 120a may determine that data service 140b is configured to handle requests such as CRUD request 430. In this example, data service 140b is also referred to as a remote data service.

Then, broker 120a may transmit a message 444, comprising CRUD request 430, to data service 140b, and request retrieving the requested dataset.

Upon receiving message 444, data service 140b may parse the message, extract CRUD request 430 from message 444, and determine whether access to the requested dataset is to be allowed. Data service 140b may make that determination alone, or rely on PDPs and PEPs to retrieve the applicable data access policies and determine whether access to the requested dataset is to be granted. If the access cannot be granted, then an error message, or other type of notification, may be sent to broker 120a, and then to consumer 110a.

However, if the access to the requested dataset is to be allowed, then data service 140b retrieves the requested dataset. The retrieved dataset may be transmitted from data service 140b to broker 120a in a message 446, and then from broker 120a to data service 140a in a message 448.

Then, data service 140a may transmit the requested dataset to consumer 110a in message 450. The content of message 450 includes the contents of the dataset requested by consumer 110a in CRUD request 430.

This may be illustrated using the following example: suppose Jim is consumer 110a, and Jim is an American citizen who, while traveling abroad, is admitted to an emergency room in a medical facility in a foreign country. During the admission process, Jim's medical record is requested from Jim's healthcare service provider in the States. Before Jim may obtain services at the foreign medical facility, a receptionist in the emergency room, launches a web browser on her computer, and using the browser, generates a CRUD request 430 for providing Jim's medical record from Jim's healthcare service provider in the States. The request is transmitted to data service 140a, which may correspond to a website used by the medical facility in the foreign country.

Upon receiving CRUD request 140a, in step 432, data service 140a determines whether the request may be serviced locally by a computer system of the foreign medical facility. Since CRUD request 430 includes a request for Jim's medical data maintained by Jim's healthcare service provider in the States, the location of Jim's medical records is specified using proxy pointers. Thus, the data service 140a in the form of the foreign medical facility may not service the request locally.

Since CRUD request 430 specifies the requested dataset using proxy pointers, data service 140*a* generates a message 440, which includes the proxy pointers specifying a location of Jim's medical record, and a request for retrieving Jim's medical record. Message 440 is sent to broker 120*a*, which performs a data service lookup in step 442, and upon identifying a data service 140*b* as configured to manage Jim's medical record, transmits CRUD request 430 in a message 440 to data service 140*b*.

In response to receiving message 440, data service 140*b* determines whether access to Jim's medical records is to be granted to data service 140*a* associated with the foreign medical facility. The access may be denied if Jim has indicated that his medical records are not be shared with foreign medical facilities, or Jim's healthcare service provider indicated that such sharing is forbidden. If data service 140*b* denies access to Jim's medical record to data service 140*a*, then data service 140*a* may generate an error notification, transmit the error notification to broker 120*a*, which in turn may transmit the error notification to a web browser on the receptionist' computer.

However, if data service 140*b* determines that access to Jim's medical records is to be granted to the data service 140*a* of the foreign medical facility, then data service 140*b* retrieves Jim's medical record from a persistent storage device, and transmits Jim's medical record to broker 120*a*, which then transmits Jim's medical record to data service 140*a* in message 448. Then, Jim's record is transmitted in a message 450 to a browser on the receptionist's computer.

Figure 5:
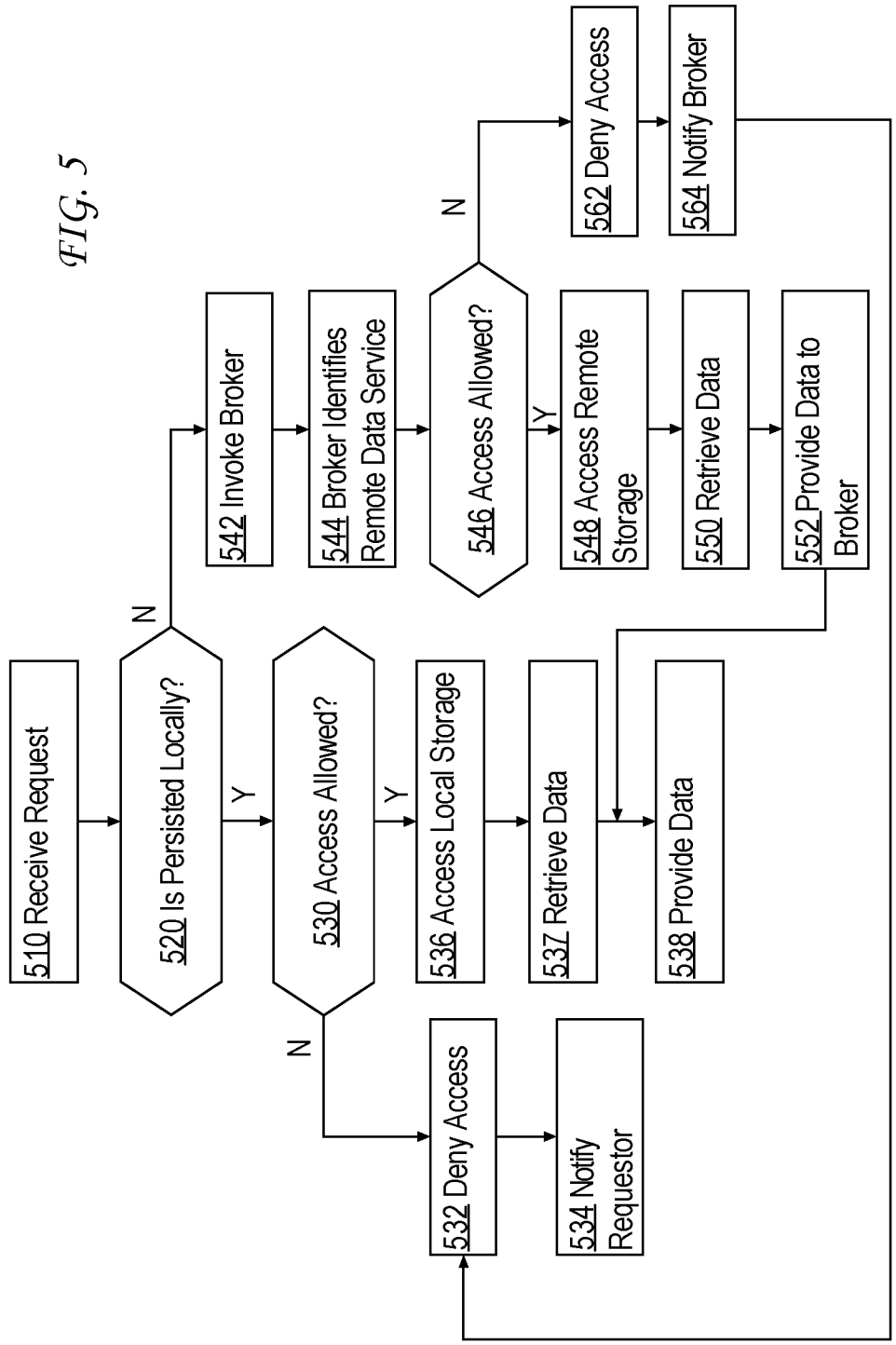
FIG. 5 illustrates a flow chart for a compliance-brokered read access control.

FIG. 5 illustrates a flow chart for a compliance-brokered read access control. In step 510, a local data service receives a CRUD request to access and read a particular dataset from storage resources maintained by a distributed data system.

Upon receiving the request, a local data service may refer to its PDP, and request that the PDP determines whether the requested dataset is persistently stored in a local storage device, or is "proxied," which means that the requested dataset is persistently stored in a remote storage device.

In step 520, a PDP analyzes the request, and determines whether the requested dataset is persisted locally or "proxied." That determination may be made based on the manner in which the requested dataset is specified in the request. For example, if the requested dataset is referred to using pointers to logical or physical addresses that belong to a local storage address space, then the PDP may determine that the requested dataset is stored and maintained locally. However, if the requested dataset is referred to using proxy pointers that point to logical or physical addresses of a remote storage address space or proxy servers, then the PDP may determine that the requested dataset is stored and maintained remotely.

If the requested dataset is persisted locally, then the process proceeds to step 530. If the requested dataset is "proxied," then the process proceeds to step 542.

In step 530, it is determined that the requested dataset was specified using pointers to local storage device. Then, the process determines whether access to the requested dataset may be granted. This determination may be performed by the data service alone. Alternatively, if the data service cooperates with PDPs and PEPs, then the data service may delegate such a determination to the PDP units and PEP units. For example, the data service may transmit a message to its PEP to request providing a decision whether access to the dataset specified in the CRUD request is to be allowed. In deriving the decision, PEP may cooperate with one or more PDP units. Once the decision is derived, the decision may indicate that the access to the requested dataset is to be either allowed or denied.

If access to the requested dataset is allowed, then the process proceeds to step 536. However, if access to the requested dataset is to be denied, then the process proceeds to step 532.

In step 536, a local data service facilities access to the requested dataset, and enables access to one or more persistent local storage devices.

In step 537, the requested dataset is retrieved from a persistent local storage, and in step 538 the requested dataset is provided to the consumer that requested the dataset.

However, if access to the requested dataset is denied, then in step 532, a local data service refuses to provide the requested dataset to the requester, and, in step 534, the local data service generates a notification message for the dataset requester. The notification message may indicate the reason for which access to the dataset was denied. Furthermore, the notification message may include suggestions for actions that the requester may purse to obtain access to the requested dataset.

If the requested dataset is "proxied," then, in step 542, a local data service invokes one or more brokers and delegates the task of accessing the requested dataset to the brokers. For example, the local data service may communicate with one or more federated brokers, described above. A federated broker may receive a message from the data service indicating the request for the dataset.

In step 544, a broker uses the content of the received request to identify one or more proxy pointers that specify the requested dataset. The proxy pointers may be used to identify one or more remote data services that manage access to the requested dataset. Once the remote data services are identified, the broker transmits the request to the identified data services. The identified remote data services are considered to be "remote" with respect to the original data service that received the request from a consumer.

In step 546, a remote data service receives a request for the dataset, and parses the request. Based on the contents of the request, the remote data service determines whether access to the requested dataset is to be granted.

In making that determination, a remote data service may use its own local resources, including its local brokers, PEP units and PDP units, or remote PEP and PDP policy engines.

If a remote data service determines that access to the requested dataset is allowed, then the process proceeds to step 548. Otherwise, the process proceeds to step 562.

In step 548, a remote data service accesses the requested dataset stored in a persistent storage device, and, in step 550, the remote data service retrieves the requested dataset from the storage.

In step 552, a remote data service provides the retrieved dataset to a broker, which then provides the dataset to a local data service. Then, the process proceeds to step 538, in which the local data service provides the dataset to a consumer that requested the dataset.

However, if in step 546, a remote data service determined that access to the requested dataset is denied, then, in step 562, the remote data service denies the requested access, and in step 564, the remote data service notifies a broker about the access denial.

Once a broker is notified that access to the requested dataset is denied by a remote data service, the broker conveys the decision to a data service that received the original request for the dataset.

Upon receiving the denial decision from the broker, a local data service, in step 532, denies the consumer access to the requested dataset, and optionally, generates a notification, as it was described in step 543, above.

In the example described above, a local data service communicates with one broker, and the broker communicates with one remote data service. However, in an embodiment, each of the data services may communicate with a plurality of federated brokers.

7.3. Compliance-Brokered Write Access Control

Figure 6:
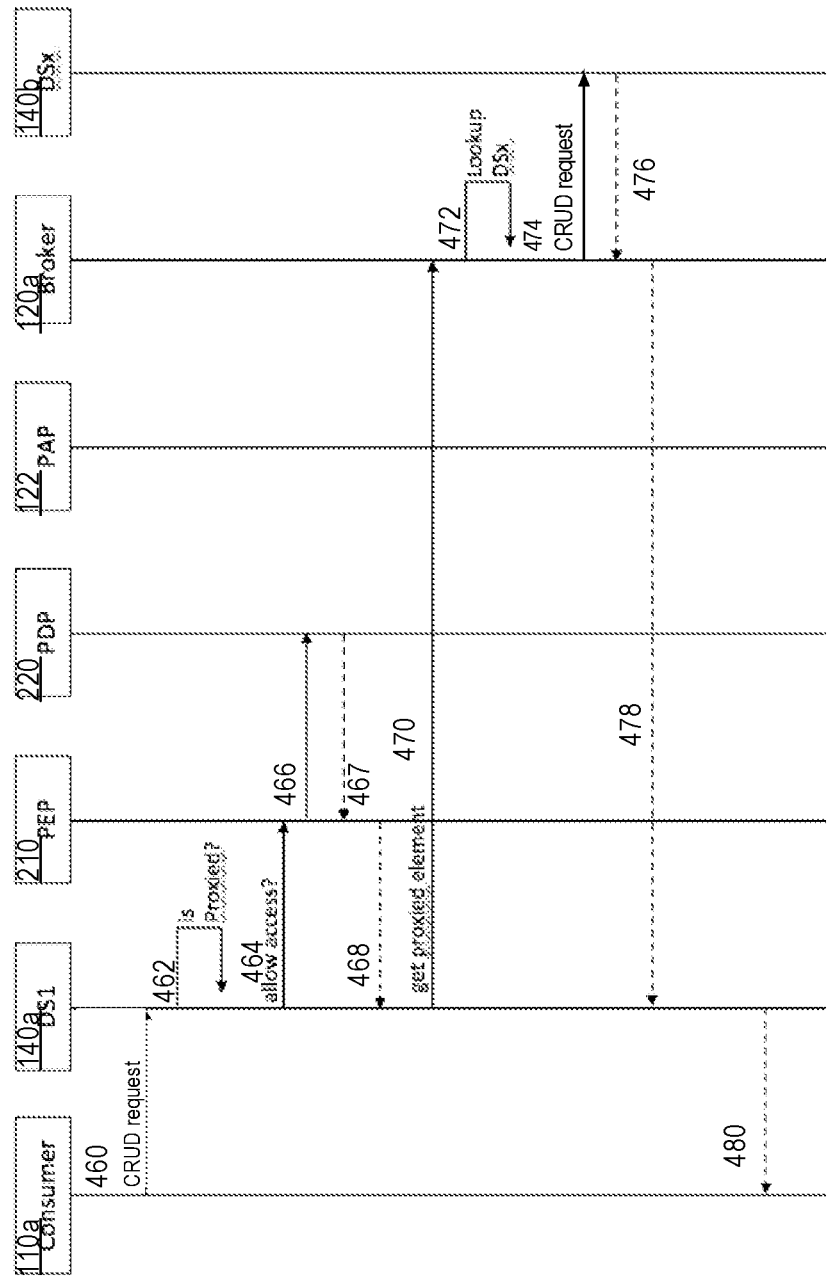
FIG. 6 illustrates an example of a compliance-brokered write access control.

FIG. 6 illustrates an example of a compliance-brokered write access control. In the depicted example, CRUD request 460 pertains to a write-type request, and is generated and issued by data service consumer 110a. For example, CRUD request 430 may be a request generated by a web browser that data service consumer 110a launched on his computer workstation. Data service consumer 110a may represent an individual, a customer, a patient, a shopper, and the like.

Upon receiving CRUD request 460, data service 140a may determine the type of access requested in CRUD request 460, and whether the request to access data is to be allowed. Depending on the implementation, data service 140a may attempt to make such determinations by itself, or may contact a policy engine executed on another device. In this example, data service 140a is also referred to as a local data service.

In step 462, data service 140a determines a policy that may be applicable to the request, and uses the policy to determine whether the data element, specified in CRUD request 460 is proxied. If the data element is proxied, then the element needs to be stored remotely. If the data element is not proxied, then the element may be stored locally.

If the data element is not proxied, then data service 140a transmits a message 464 to a PEP 210, which then transmits a message 466 to PDP 220. In an embodiment, PEP 210 and PDP 220 are implemented locally with respect to data service 140a.

Message 464 may include a request to provide a decision whether the data element specified in CRUD request 430 may be created, updated or deleted locally.

Upon receiving message 464, PEP 210 may parse the received message 464, and forward a message 466, including a request to provide the decision, to PDP 220.

PDP 220 may parse the received message 466, and use the parsed information to determine whether the data element may be created, modified or deleted locally. Upon reaching the decision, PDP 220 may send a message 467 to PEP 210 to indicate the decision.

Then, PEP 210 may communicate, to local data service 140a, a message 468 that includes the decision. Based on the decision, the data element is either stored in a local persistent storage device, or an error notification is sent to consumer 110a. A confirmation 480 that the data element was successfully (or was not successfully) stored in a local storage device may be sent to consumer 110a.

However, if, upon applying a policy to CRUD request 110a, local data service 140a determines that the data element cannot be stored locally, then local data service 140a generates an error message, and sends it as message 580 to consumer 110a.

If CRUD request 460 specifies the dataset to be written using a proxy pointer, then the dataset is written to a remote storage device. Subsequently, in step 470, local data service 140a invokes broker 120a to help in persistently storing the data element.

While invoking broker 120a, local data service 140a may transmit to broker 120a message 470. Message 470 may include various parameters, including, for example, CRUD request 460, the proxy pointers, and other data. The parameters may include an indicator of the operation that is requested in CRUD request 460, and one or more attribute-value pairs. The operation indicator may indicate whether CRUD request 460 pertains to creating, updating or deleting a data element. The proxy pointer may indicate a proxy-element-identifier that indicates the location at which the data element is to be created, updated or deleted. An attribute-value pair may indicate the element attribute that is to be created, modified or deleted, and the value that is to be assigned to the element attribute.

Upon receiving message 470, broker 120a may parse message 470 to identify one or more proxy pointers identifying a dataset requested by CRUD request 430, and in step 472, broker 120a may perform a data service lookup to identify a remote data service which is configured to manage the data element specified by the one or more proxy pointers. For example, broker 120a may determine that remote data service 140b manages the data element specified by the one or more proxy pointers.

Broker 120a may transmit a message 474, comprising CRUD request 460 and the above mentioned parameters, to remote data service 140b, and request writing the data element.

If the data element is created, modified or deleted successfully, then remote data service 140b may notify broker 120a using a message 476 that CRUD request 460 was successfully performed. However, if CRUD request 460 was not successfully completed, then remote data service 140b may notify broker 120a that the completion failed.

Broker 120a may communicate the success or failure notification to local data service 140a in a message 478. Upon receiving message 478, local data service 140a sends to consumer 110a a message 480 to notify consumer 110a that CRUD request 460 was either completed successfully or failed.

Figure 7:
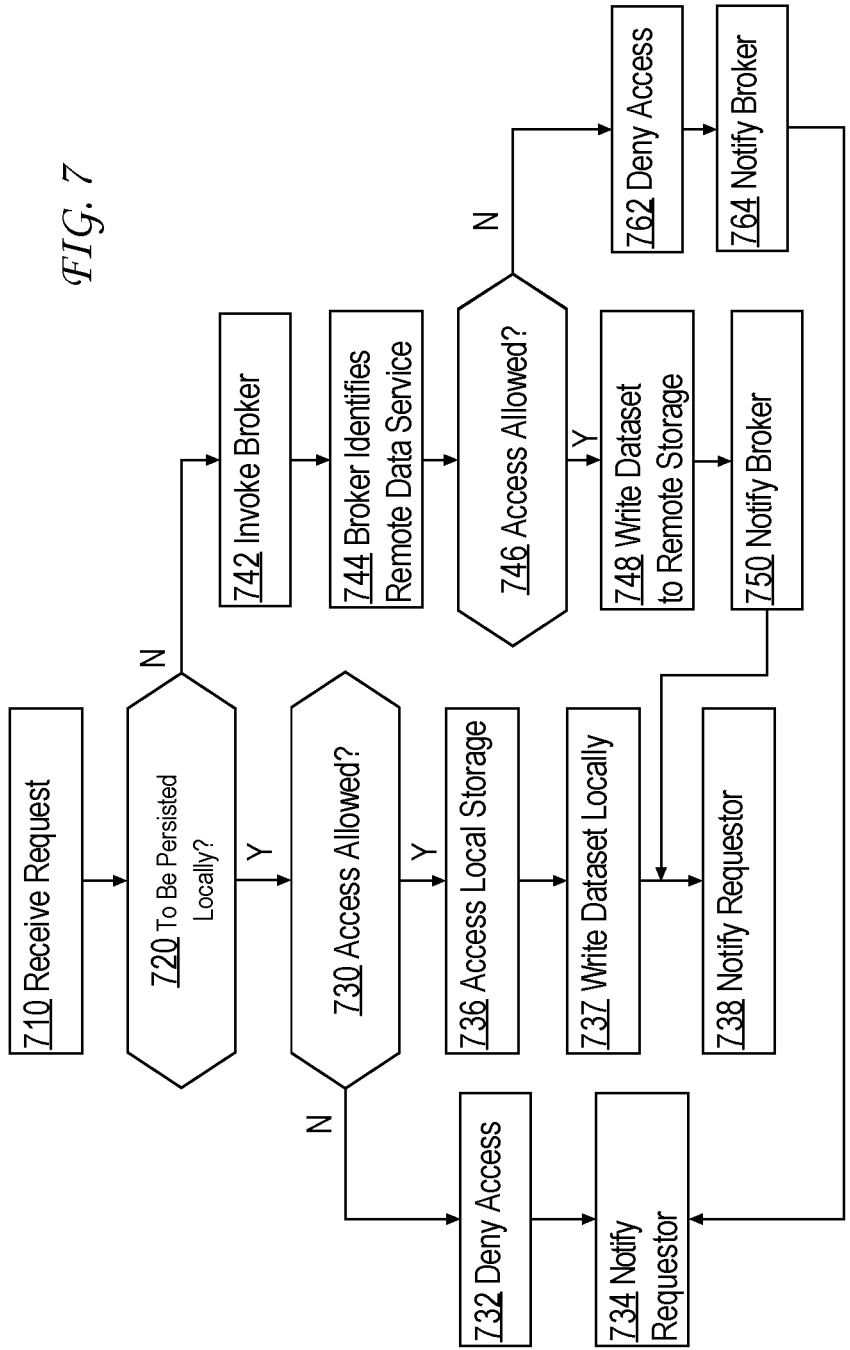
FIG. 7 illustrates a flow chart for a compliance-brokered write access control.

FIG. 7 illustrates a flow chart for a compliance-brokered write access control.

In step 710, a local data service receives a request to access and read a particular dataset from storage resources maintained by a distributed data system. The request may correspond to a CRUD request 460 described above.

Upon receiving the request, a local data service may refer to its PDP, and request that the PDP determines whether the requested dataset is to be written to a local persistent storage device, or is "proxied," which means that the requested dataset is persistently is to be written to a remote persistent storage device.

In step 720, a PDP analyzes the request, and determines whether the dataset requested by the request is persisted locally or "proxied." That determination may be made based on the manner in which the requested dataset is specified in the request. For example, if the requested dataset is referred to using pointers to logical or physical addresses that belong to a local storage address space, then the PDP may determine that the requested dataset is maintained locally. However, if the requested dataset is referred to using proxy pointers that point to logical or physical addresses that belong to a remote storage address space (proxy servers), then the PDP may determine that the requested dataset is maintained remotely.

If the requested dataset is persisted locally, then the process proceeds to step 730. If the requested dataset is "proxied," then the process proceeds to step 742.

In step 730, it is determined that the requested dataset was specified in the request using pointers to local persistent storage device, and thus, the process determines whether access to the requested dataset may be granted. This determination may be performed by the local data service alone. Alternatively, the local data service may delegate such a determination to remote PDP and PEP units. Once the decision is derived, the decision may either indicate that access to the requested dataset is allowed or denied.

If access to the requested dataset is allowed, then the process proceeds to step 736. Otherwise, the process proceeds to step 732.

In step 736, a local data service facilities access to the requested dataset, and, in step 737, enables writing the data element to a local storage device.

In step 738, a notification about the successful (or unsuccessful) writing of the data element is provided to the consumer.

However, if access to the requested dataset is denied, then in step 732, a local data service refuses to write the data element, and, in step 734, the local data service generates a notification message for the dataset requester, and transmits the notification in step 734. The notification message may indicate the reason for which access to the dataset was denied. Furthermore, the notification message may include suggestions for actions that the requester may pursue to successfully write the dataset.

If the requested dataset is "proxied," then, in step 742, a local data service invokes one or more brokers and delegates the task of accessing the requested dataset to the brokers. For example, the data service may communicate with one or more federated brokers, described above. A federated broker may receive a message from the local data service indicating the request to write the dataset to a remote storage device.

In step 744, a broker uses the content of the received request to identify one or more proxy pointers that specify the dataset. The proxy pointers may be used to identify one or more remote data services that manage the dataset. Once the remote data services are identified, the broker transmits the request to the identified data services. The identified data services are considered to be "remote" with respect to the local data service that received the request from a consumer.

In step 746, a remote data service receives the request to write the dataset to a remote data storage unit, and parses the request. Based on the contents of the request, the remote data service determines whether access to the requested dataset is to be granted.

In making that determination, a remote data service may use its own, local resources, including its local brokers, PEP units and PDP units.

If a remote data service determines that writing the dataset is allowed, then the process proceeds to step 748. Otherwise, the process proceeds to step 762.

In step 748, a remote data service accesses a remote data storage device and writes the dataset to the remote data storage. Then the process proceeds to step 738, in which the remote data service notifies the broker that the writing was completed either successfully or unsuccessfully.

However, if in step 746, a remote data service determined that writing the dataset is denied, then, in step 762, the remote data service refuses to write the dataset to the remote storage device, and in step 764, the remote data service notifies a broker about the denied writing.

Once a broker is notified that access to the requested dataset is denied by a remote data service, the broker conveys the decision to a data service that received the original request for the dataset, and the data service conveys the decision to the requester.

Upon receiving the denial decision from the broker, a data service, in step 732, denies the consumer access to the requested dataset, and optionally, generates a notification, as it was described in step 743, above.

In the example described above, a data service communicates with one broker, and the broker communicates with one remote data service. However, in other embodiments, each of the data services may communicate with a plurality of federated brokers.

In an embodiment, a network-based service manages access to data by applying policies to the data. The policy-based data management system insures data protection, confidentiality and security. For example, the policy-based data management system may be used to control access to employees' records, patients' medical records, company's proprietary information, government's records, and the like.

In an embodiment, a policy-based data management system may be configured to handle data at rest, data in motion and data in action by continuously monitoring and processing data transaction requests in compliance with various policies and rules. For example, a policy-based data management system may be configured to manage data transaction request in compliance with governmental and contractual restrictions on the storage locations used to store the managed data and authorization requirements for accessing the managed data. The data compliance services may be distributed and executed by a plurality of federated brokers, which may be implemented in a variety of software-hardware applications. The compliance policies may be accessed by the federated brokers and may be used to centrally and regionally control access to the managed data.

8. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
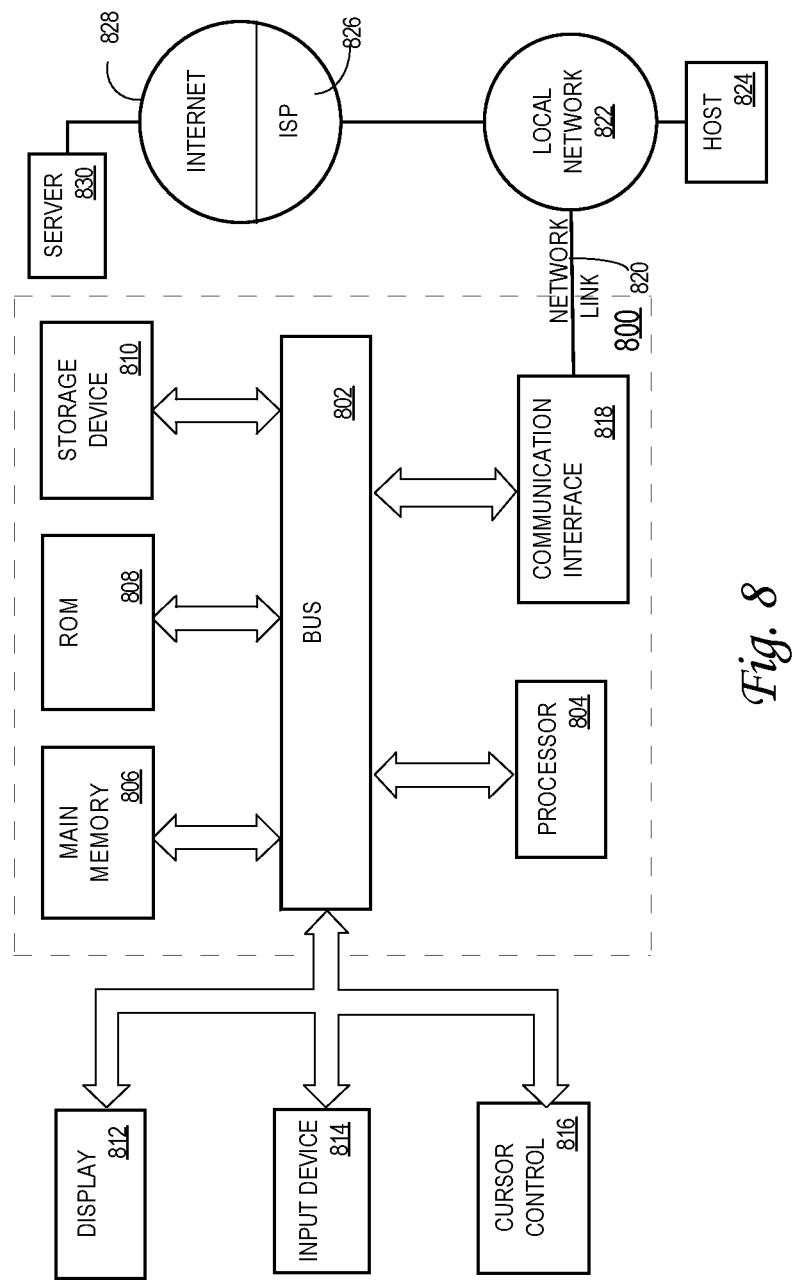
FIG. 8 illustrates a computer system with which various embodiments may be used.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A data processing system comprising:
  one or more processors; and
  one or more non-transitory computer-readable storage media storing sequences of instructions which, when executed by the one or more processors, cause the one or more processors to perform:
  maintaining, at a data compliance broker, a proxy pointer store identifying, for individual proxy pointers of a plurality of proxy pointers, corresponding geographical locations of persistent storage associated with the individual proxy pointers;
  receiving, from a data service local to a requester of the data service, a request for processing data;

applying one or more data access policies to the request to identify, from amongst the plurality of proxy pointers, a proxy pointer for the request, wherein applying the one or more data access policies is based at least in part on a first geographical location of the requester; and using the proxy pointer store to identify a second geographical location of a persistent storage associated with the proxy pointer for the request and to access the persistent storage to fulfill the request.

2. The system of claim 1, wherein the instructions, when executed cause the one or more processors to perform:

sending a remote policy request and metadata to a remote policy access point to provide one or more remote policies that are applicable to the remote policy request and the metadata; and, upon receiving the one or more remote policies, invoking a remote policy execution point to cause the remote policy execution point to apply the one or more remote policies to the remote policy request and the metadata to determine whether a particular remote data service is configured to process the remote policy request, and if so, transmitting the remote policy request to the particular remote data service for processing.

3. The system of claim 2, wherein the one or more remote policies govern access to data persistently stored in remote storage devices.

4. The system of claim 1, wherein the request is any one of: a data record create request, a data record read request, a data record update request, or a data record delete request.

5. The system of claim 1, wherein the data compliance broker is a federated broker and configured to cooperate with other federated brokers to ensure a uniform compliance with one or more remote policies.

6. The system of claim 1, wherein the data compliance broker is configured to communicate with a policy administration point to obtain one or more remote policies and updates for the one or more remote policies.

7. The system of claim 1, wherein the data service local to the requester of the data service is unable to process the request locally.

8. A data processing method comprising:

maintaining, at a data compliance broker, a proxy pointer store identifying, for individual proxy pointers of a plurality of proxy pointers, a corresponding geographical location of persistent storage associated with the individual proxy pointers;

receiving, from a data service local to a requester of the data service, a request for processing data;

applying one or more data access policies to the request to identify, from amongst the plurality of proxy pointers, a proxy pointer for the request, wherein applying the one or more data access policies is based at least in part on a first geographical location of the requester; and using the proxy pointer store to identify a second geographical location of a persistent storage associated with the proxy pointer for the request and to access the persistent storage to fulfill the request.

9. The method of claim 8, further comprising:

sending a remote policy request and metadata to a remote policy access point to provide one or more remote policies that are applicable to the remote policy request and the metadata; and, upon receiving the one or more remote policies, invoking a remote policy execution point to cause the remote policy execution point to apply the one or more remote policies to the remote policy request and the metadata to determine whether a particular remote data service is configured to process the remote policy request, and if so, transmitting the remote policy request to the particular remote data service for processing.

10. The method of claim 9, wherein the one or more remote policies govern access to data persistently stored in remote storage devices.

11. The method of claim 8, wherein the request is any one of: a data record create request, a data record read request, a data record update request, or a data record delete request.

12. The method of claim 9, wherein the one or more data access policies govern access to data persistently stored in local storage devices; and wherein the one or more remote policies govern access to data persistently stored in remote storage devices.

13. The method of claim 9, wherein the data compliance broker is a federated broker and configured to cooperate with other federated brokers with each other to ensure a uniform compliance with the one or more remote policies.

14. The method of claim 9, wherein the data compliance broker is configured to communicate with a policy administration point to obtain the one or more remote policies and updates for the one or more remote policies.

15. One or more non-transitory computer-readable media storing instructions which, when executed by one or more processors, cause performance of:

maintaining, at a data compliance broker, a proxy pointer store identifying, for individual proxy pointers of a plurality of proxy pointers, a corresponding geographical location of persistent storage associated with the individual proxy pointers;

receiving, from a data service local to a requester of the data service, a request for processing data;

applying one or more data access policies to the request to identify, from amongst the plurality of proxy pointers, a proxy pointer for the request, wherein applying the one or more data access policies is base at least in part on a first geographical location of the requester; and using the proxy pointer store to identify a second geographical location of a persistent storage associated with the proxy pointer for the request and to access the persistent storage to fulfill the request.

16. The one or more non-transitory computer-readable media of claim 15, wherein the instructions, when executed cause the processors to performing:

sending a remote policy request and metadata to a remote policy access point to provide one or more remote policies that are applicable to the remote policy request and the metadata; and, upon receiving the one or more remote policies, invoking a remote policy execution point to cause the remote policy execution point to apply the one or more remote policies to the remote policy request and the metadata to determine whether a particular remote data service is configured to process the remote policy request, and if so, transmitting the remote policy request to the particular remote data service for processing.

17. The one or more non-transitory computer-readable media of claim 16, wherein the one or more remote policies govern access to data persistently stored in remote storage devices.

18. The one or more non-transitory computer-readable media of claim 15, wherein the request is any one of: a data record create request, a data record read request, a data record update request, or a data record delete request.

19. The one or more non-transitory computer-readable media of claim 15, wherein the data compliance broker is a federated broker and configured to cooperate with other federated brokers to ensure a uniform compliance with one or more remote policies.

20. The one or more non-transitory computer-readable media of claim 16, wherein the data compliance broker is configured to communicate with a policy administration point to obtain the one or more remote policies and updates for the one or more remote policies.

* * * * *